US011360716B2

(12) United States Patent
Hayakawa (10) Patent No.: US 11,360,716 B2
(45) Date of Patent: Jun. 14, 2022

(54) IMAGE PROCESSING APPARATUS AND METHOD

(71) Applicant: CANON KABUSHIKI KAISHA, Tokyo (JP)

(72) Inventor: Takeshi Hayakawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/361,056

(22) Filed: Jun. 28, 2021

(65) Prior Publication Data

US 2022/0004344 A1     Jan. 6, 2022

(30) Foreign Application Priority Data

Jul. 1, 2020 (JP) .............................. JP2020-114217

(51) Int. Cl.
*G06F 21/41* (2013.01)
*G06F 3/12* (2006.01)

(52) U.S. Cl.
CPC ............ *G06F 3/1204* (2013.01); *G06F 3/126* (2013.01); *G06F 3/1287* (2013.01)

(58) Field of Classification Search
None
See application file for complete search history.

(56) References Cited

U.S. PATENT DOCUMENTS

| 8,819,799 | B2* | 8/2014 | Oguma | H04L 63/083 |
| | | | | 726/8 |
| 9,071,605 | B2* | 6/2015 | Ishino | H04L 63/10 |
| 9,183,376 | B2* | 11/2015 | Shinoda | G06F 21/44 |
| 9,282,097 | B2* | 3/2016 | Agarwal | G06F 21/41 |
| 10,791,506 | B2* | 9/2020 | Roskind | G06F 21/604 |

FOREIGN PATENT DOCUMENTS

JP         2019161445 A         9/2019

OTHER PUBLICATIONS

Murukutla et al., Single Sign on for Cloud, Dec. 2012, 2012 International Conference on Computing Sciences, pp. 176-178.*
Revar et al., Securing User Authentication using Single Sign-On in Cloud Computing, Dec. 2011, Institute of Technology, Nirma University, Ahmedabad, 382 481.*

* cited by examiner

*Primary Examiner* — Paul F Payer
(74) *Attorney, Agent, or Firm* — Canon U.S.A., Inc. IP Division (57) ABSTRACT

An image processing apparatus receives, in a case where a plurality of cloud services is managed in association with one input confirmation code, an input of a display name to be display in the image processing apparatus and an input of an identification code for each cloud service at a time when the cloud service is selected to be used in the image processing apparatus, and stores a display name and an identification code in association with each other for each cloud service.

7 Claims, 14 Drawing Sheets

REGISTRATION IS COMPLETED.

YOU CAN USE FOLLOWING SERVICES.
- CLOUD SERVICE A
- CLOUD SERVICE B

IMAGE PROCESSING APPARATUS AND METHOD

BACKGROUND

Field of the Disclosure

The present disclosure relates to a technique for using a cloud service provided via a network in an image processing apparatus.

Description of the Related Art

Cloud services provided via networks are increasingly being used in image processing apparatuses such as printers and multifunction peripherals provided with a printing function and a scanner function.

Data scanned by an image processing apparatus can be transmitted to a cloud service. According to Japanese Patent Application Laid-Open No. 2019-161445, a scanning application in a personal computer (PC) executes a series of processing defined by a workflow including obtaining image data read by a scanner connected by a Universal Serial Bus (USB) and the like and uploading the image data to a cloud server. The PC transmits account information about a user to the cloud server and obtains an access token from the cloud server. The scanning application uploads the image data together with the access token to the cloud server.

Recently, types of the cloud services have increased, and a user often selectively uses different cloud services from an image processing apparatus depending on the application. In such a case, it is necessary for the user to repeat similar registration processing a plurality of times in order to use a plurality of cloud services in the image processing apparatus, which is troublesome.

SUMMARY

According to embodiments of the present disclosure, an image processing apparatus includes a scanner, at least one memory storing instructions, and at least one processor executing the instructions causing the image processing apparatus to receive an input of a confirmation code that is issued upon selecting a cloud service via a website provided for the image processing apparatus in order to use the cloud service from the image processing apparatus, transmit the confirmation code to a server that provides the website, receive, in a case where a plurality of cloud services is managed in association with the confirmation code in the server, an input of a display name to be displayed in the image processing apparatus for each cloud service at a time when the cloud service is selected to be used in the image processing apparatus, and store a display name received for each of the plurality of cloud services managed in association with the confirmation code. In a case where an input of an identification code is further received in addition to the input of the display name with respect to any one of the plurality of cloud services managed in association with the confirmation code, both of the display name and the identification code are stored with respect to the cloud service.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the attached drawings.

Figure 1:
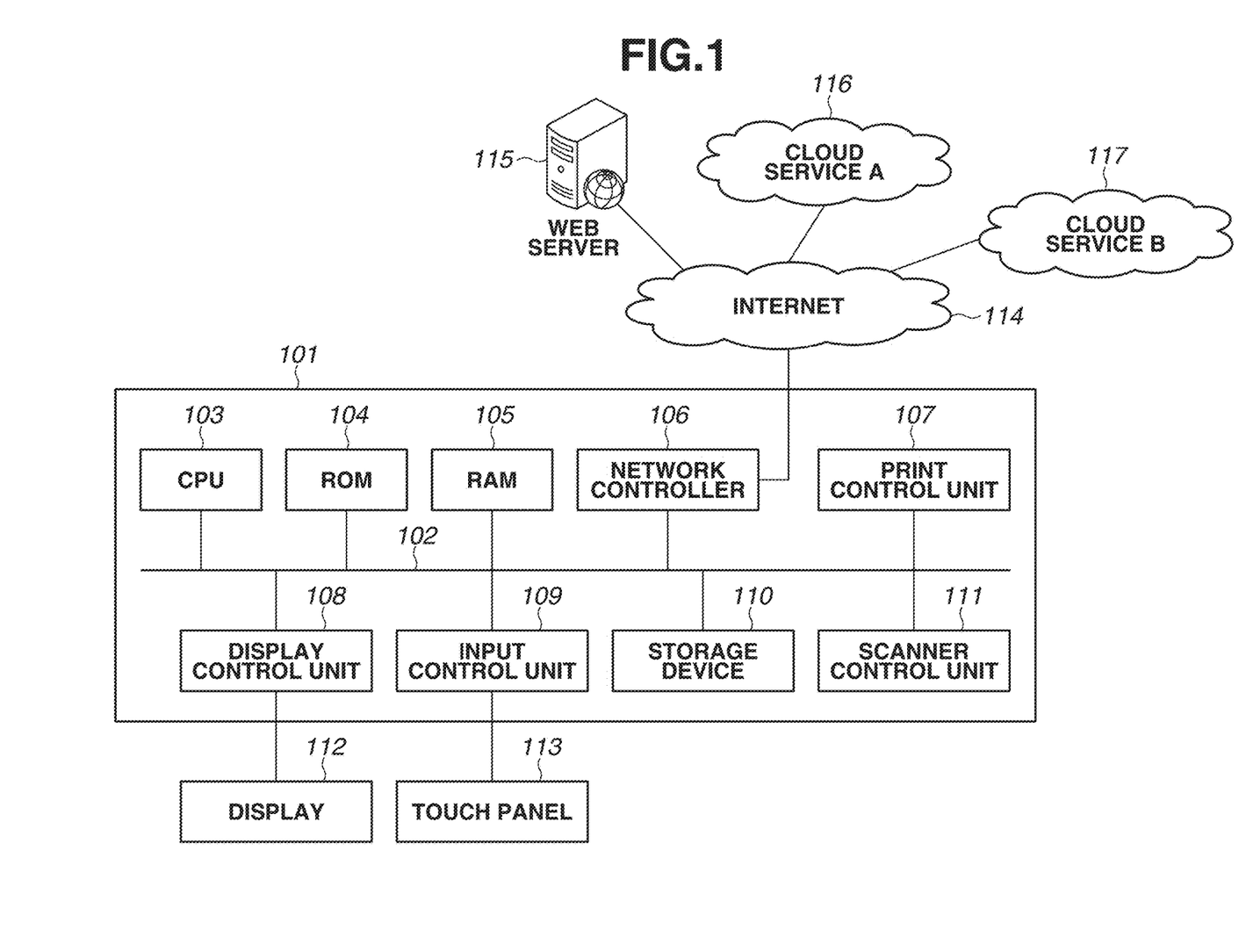
FIG. 1 illustrates a system configuration and a block configuration of an image processing apparatus.

A first exemplary embodiment will be described below. FIG. 1 illustrates a system configuration which can be applied to the present exemplary embodiment and a block configuration of an image processing apparatus included in the system.

A multifunction peripheral 101 is an example of the image processing apparatus and has a scanning function and a printing function. The multifunction peripheral 101 includes components 103 to 111 as hardware configurations, and each component is connected to a system bus 102. The multifunction peripheral 101 further includes a display 112 and a touch panel 113. A read-only memory (ROM) 104 stores an operating system (OS) and software for controlling each function of the multifunction peripheral 101 which are executed by a central processing unit (CPU) 103. A random access memory (RAM) 105 is a work memory area for executing various programs including a program for realizing embodiments of the present disclosure. Further, the RAM 105 is a memory for temporarily storing data obtained from a web server by network communication, authentication information for accessing a web service, and the like. A storage device 110 is a nonvolatile storage device which stores various operation mode settings, operation logs, and the like, which are stored even after the multifunction peripheral 101 is restarted.

A network controller 106 controls communication of the multifunction peripheral 101. The communication includes wireless communication. A print control unit 107 performs control related to printing by the printing function of the multifunction peripheral 101. A display control unit 108 controls information to be output from the multifunction peripheral 101. An input control unit 109 controls information input by a user using a button and the touch panel 113 of the multifunction peripheral 101. A scanner control unit 111 performs control related to the scanning function of the multifunction peripheral 101. Various pieces of information on the multifunction peripheral 101 are provided to a user using the print control unit 107, the display control unit 108, the input control unit 109, and the scanner control unit 111.

The multifunction peripheral 101 can connect to an Internet 114 via the network controller 106. A web server 115 is provided with a web site and a service for using the multifunction peripheral 101. A cloud service 116 is one of the services for using a storage and the like via the Internet 114. For example, the cloud service 116 is a storage service for storing data scanned by the multifunction peripheral 101 and managing the data to be available for viewing. A cloud service 117 is one of the cloud services different from the cloud service 116. For example, the cloud service 117 is a service for managing data in a notebook format without depending on a file format and the like. The multifunction peripheral 101 can also cooperate with other cloud services (not illustrated).

The web server 115 and the cloud services 116 and 117 are realized by an information processing apparatus provided with the following general hardware configuration (not illustrated) executing a program for realizing processing described below.

The information processing apparatus includes at least storage units such as a CPU, a RAM, a ROM, and a hard disk drive (HDD) and a network interface as hardware configurations. The CPU executes an OS and various programs stored in the ROM and the storage unit using the RAM as a work area. The network interface is connected to the network such as the Internet 114 and realizes various types of communication.

The web server 115 and the cloud services 116 and 117 can also be realized by a cloud computing technology. In this case, a program according to embodiments of the present disclosure is executed using a virtual machine that is operated on hardware and software resources provided in a data center constructed using one or more information processing apparatuses including the above-described configuration.

Figure 2:
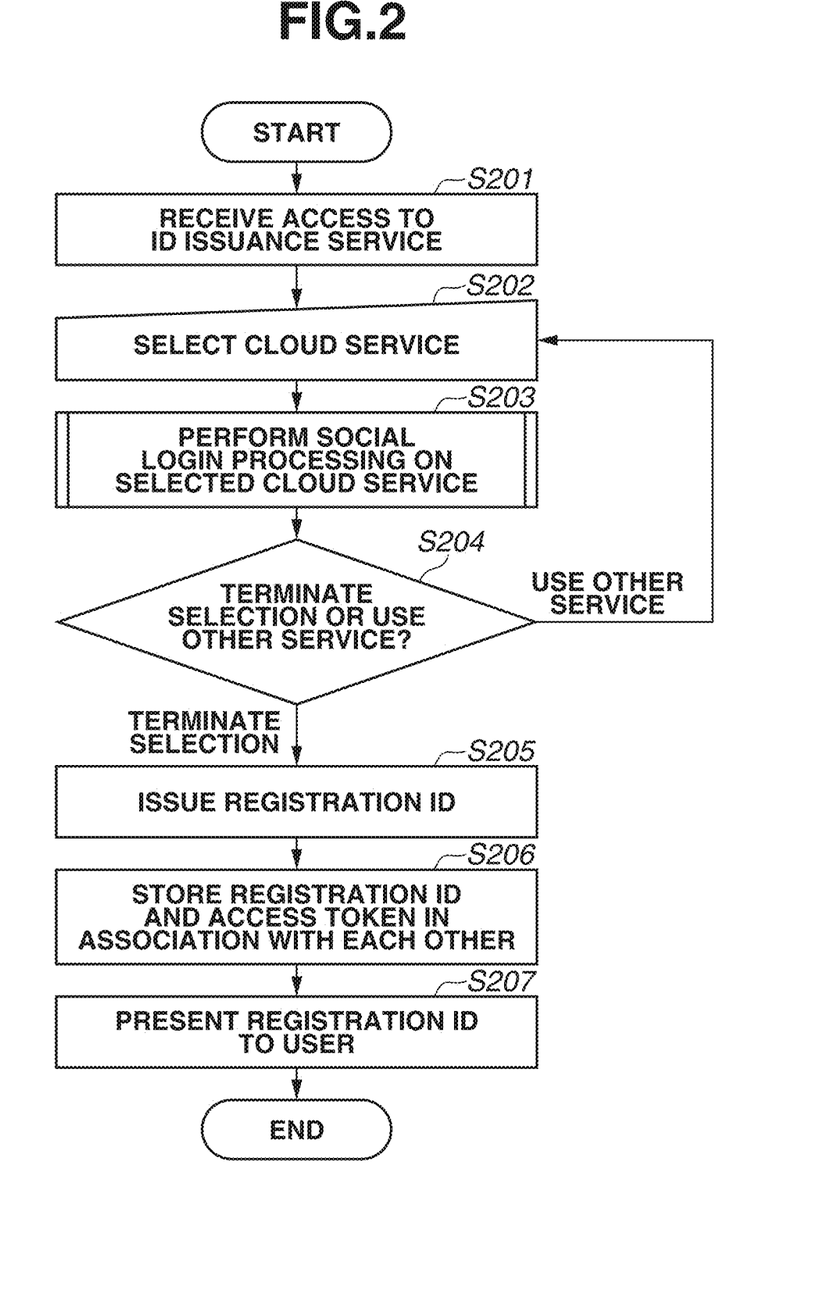
FIG. 2 is a flowchart illustrating processing related to issuance of an identification (ID) for starting use of a cloud service in a web server.

FIG. 2 is a flowchart illustrating processing related to issuance of an identification (ID) for starting use of a cloud service in the web server 115. The ID issued in this processing is used in the multifunction peripheral 101.

In step S201, the web server 115 receives access to an ID issuance service provided by the web server 115 via the Internet 114. The access is performed by a user using a web browser via a website provided by a company that develops or sells the multifunction peripheral 101.

In step S202, the web server 115 receives a selection of a cloud service to be used by the user in the multifunction peripheral 101. For example, the web server 115 receives the selection via a screen 501 illustrated in FIG. 5 that is provided by the ID issuance service.

Figure 5:
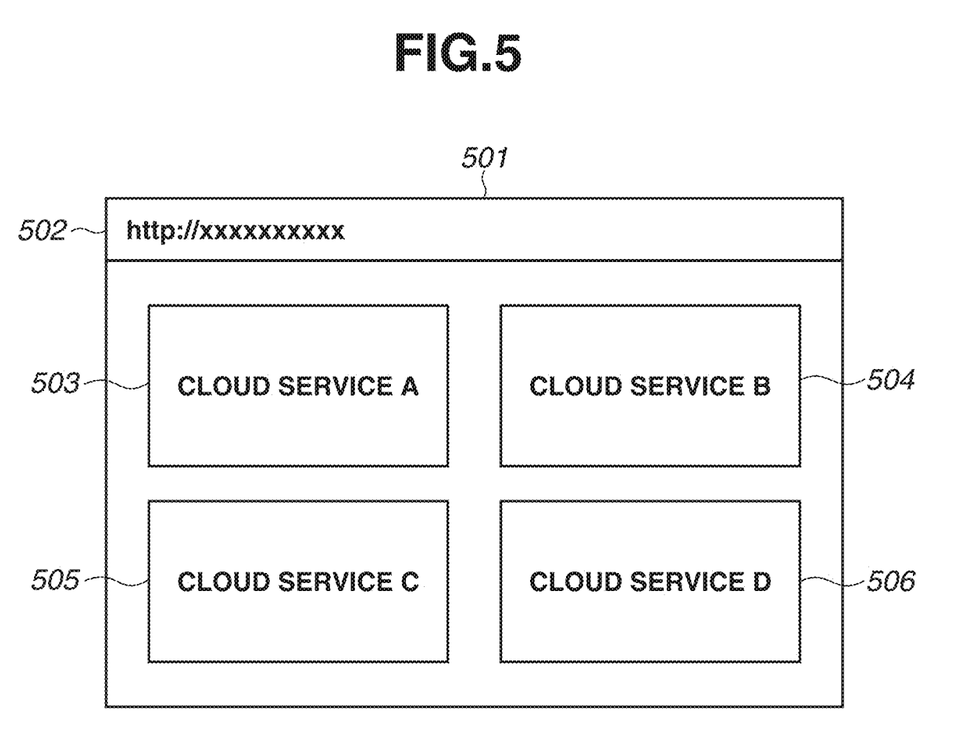
FIG. 5 illustrates an example of a screen for selecting the cloud service provided by the web server.

In FIG. 5, a Uniform Resource Locator (URL) for accessing the ID issuance service is set in an address input portion 502 of the web browser. The user can select one or more cloud services that can be used in the multifunction peripheral 101 via the screen 501 provided by the ID issuance service. The screen includes buttons 503, 504, 505, and 506 indicating selectable cloud services. In the present exemplary embodiment, it is assumed that one or more arbitrary cloud services are selected from a plurality of services that are often used by a user of the multifunction peripheral including the storage service for storing data obtained by the scanning function. The plurality of cloud services also includes a print service and a facsimile service for transmitting image data obtained by scanning by a facsimile.

In step S203, the web server 115 prompts the user to perform authentication for using the cloud service selected in step S202. The processing is performed to use a technique called "social login." A subroutine in step S203 is described in detail below with reference to FIG. 3. The web server 115 can obtain an access token from the selected cloud service by performing this processing.

Figure 6:
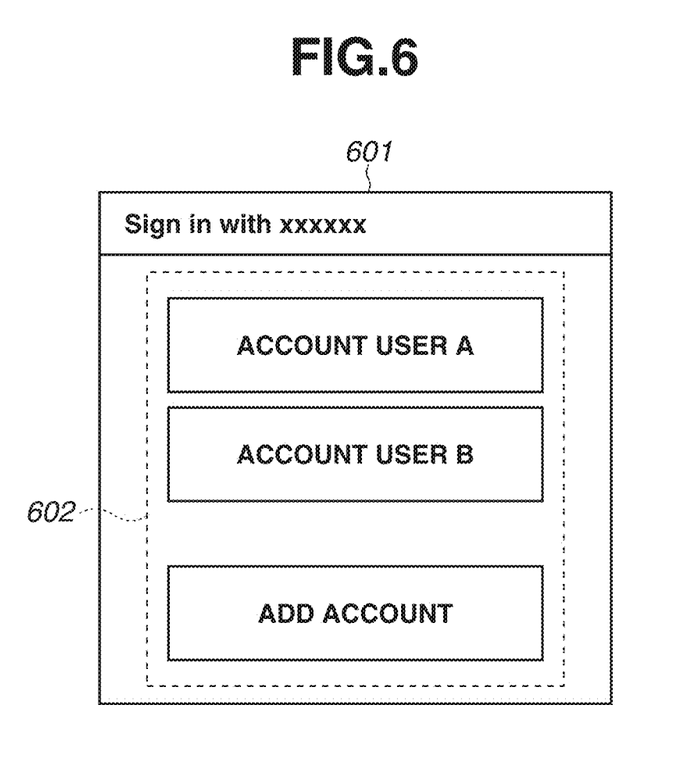
FIG. 6 illustrates an example of a screen for selecting an account for social login.

FIG. 6 illustrates an example of a screen 601 that is displayed on the web browser to realize the social login. If the user selects a cloud service, the screen 601 is displayed. The screen 601 includes an account selection portion 602 which allows the user to select an account to be used for authentication for the cloud service.

Figure 7:
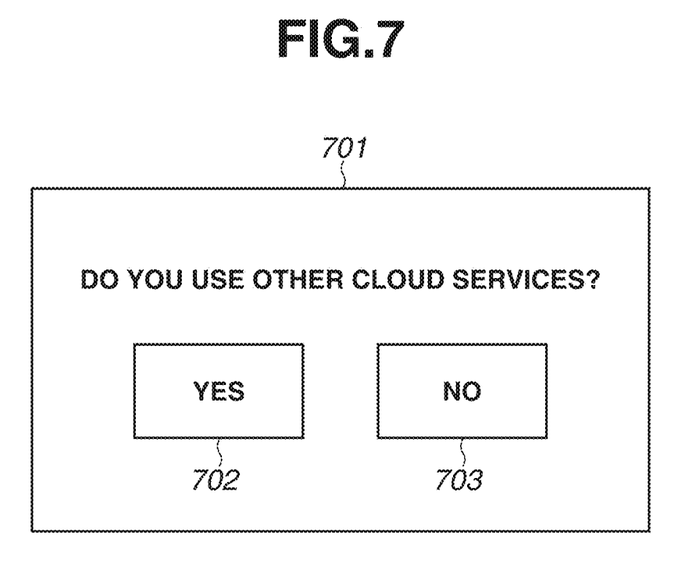
FIG. 7 illustrates an example of a screen for inquiring whether to continue selection of the cloud service.

In step S204, the web server 115 displays a screen 701 illustrated in FIG. 7 for inquiring the user whether to use another cloud service or to terminate the selection of a cloud service. The screen 701 includes a button 702 to be selected in a case where the user wants to use another cloud service as well and a button 703 to terminate the selection. In a case where a user selection received via the screen 701 is to use another cloud service ("USE OTHER SERVICE" in step S204), the processing returns to step S202. In a case where the user selection to terminate the selection of a cloud service is received ("TERMINATE SELECTION" in step S204), the processing proceeds to step S205.

In step S205, the web server 115 issues a registration ID required to access one or more cloud services selected in the processing from steps S202 to S204 from the multifunction peripheral. The registration ID is a confirmation code represented by a number consisting of about 11 digits. In the present exemplary embodiment, the registration ID in a case where a plurality of services is selected may be particularly referred to as a "multiple service registration ID" in some cases.

In step S206, the web server 115 stores the registration ID and the access tokens obtained from each of one or more cloud services selected by the user in association with each other.

Figure 8:
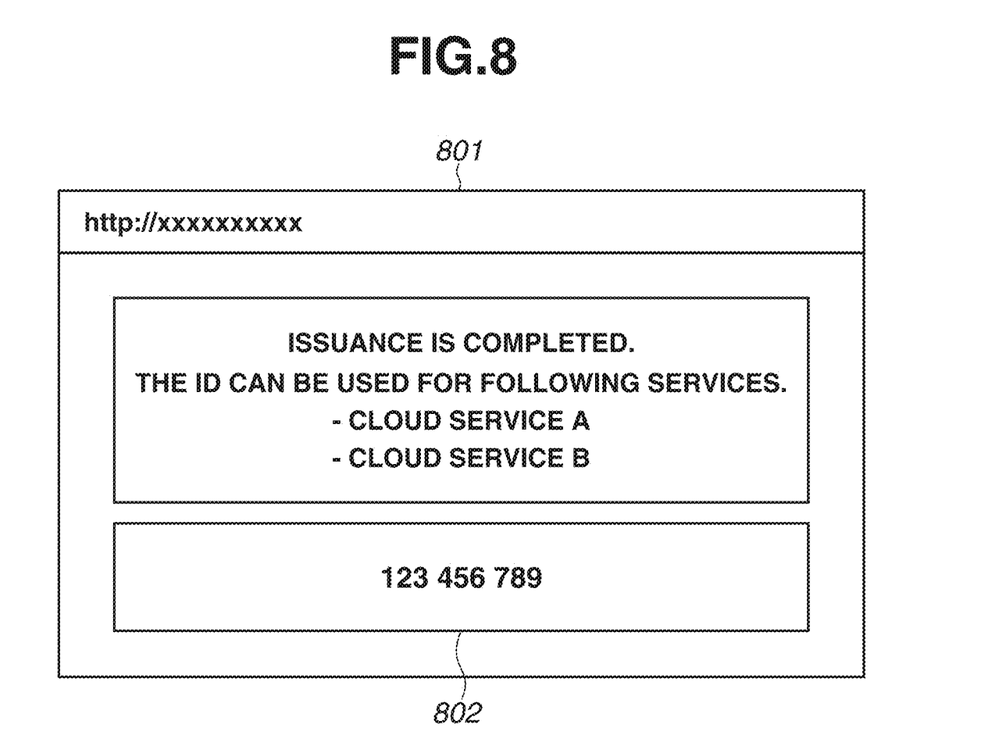
FIG. 8 illustrates an example of a screen indicating completion of issuance of a registration ID provided by the web server.

In step S207, the web server 115 presents the registration ID issued in step S205 to the user by displaying the registration ID on a screen provided by the ID issuance service, and then the present processing is ended. FIG. 8 illustrates a screen 801 indicating completion of issuance of the registration ID provided by the ID issuance service as an example of the processing in step S207. A registration ID 802 issued by the ID issuance service of the web server 115 is displayed on the screen 801. The screen 801 presents that one registration ID that can be used in common for two cloud services A and B is issued. Alternatively information similar to the registration ID may be presented to the user by other means such as an electronic mail. Even in a case where only one cloud service is selected, the issued registration ID is similarly presented to a user.

Figure 3:
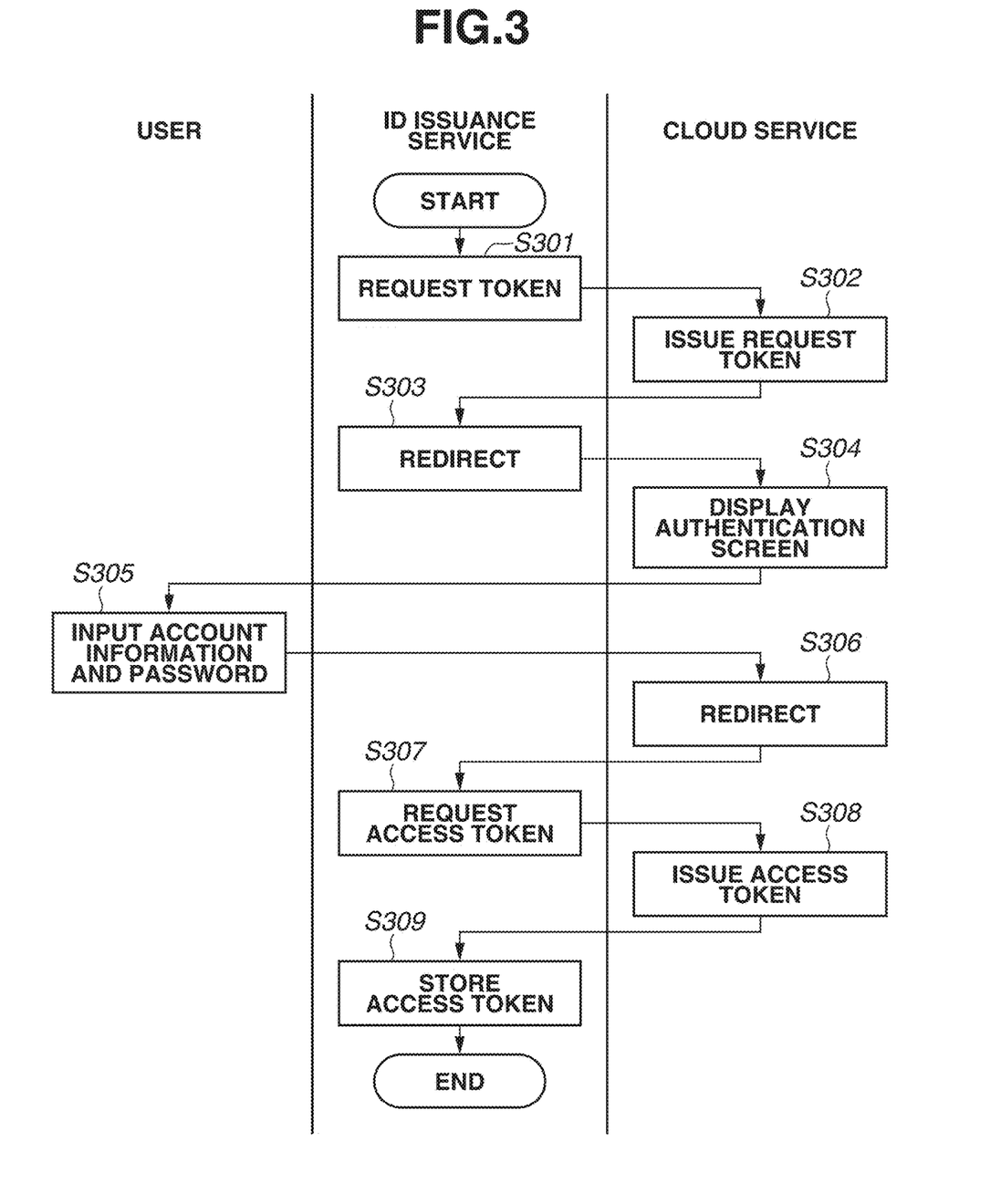
FIG. 3 is a flowchart illustrating processing for social login performed between the web server and the cloud service.

FIG. 3 illustrates a sequence of processing in step S203 described above.

In step S301, the web server 115 requests a request token from the cloud service 116 selected in step S202. In step S302, the cloud service 116 issues a request token and transmits an URL to the web server 115. Next, in step S303, the web server 115 redirects to the URL received in step S302. In step S304, the cloud service 116 displays an authentication screen. At this time, an access destination of the web browser used by the user is changed from the web server 115 to the cloud service 116 by the redirection, and the authentication screen provided by the cloud service 116 is displayed on the web browser.

In step S305, the user inputs account information and a password via the displayed authentication screen. The cloud service 116 executes authentication processing using the account information and the password input via the authentication screen.

In step S306, the cloud service 116 redirects to the web server 115. In step S307, the web server 115 requests an access token from the cloud service 116. In step S308, the cloud service 116 issues an access token in response to a successful result in the above-described authentication processing. In step S309, the web server 115 receives the access token issued by the cloud service 116 and stores the access token in a storage unit of its own.

Figure 4:
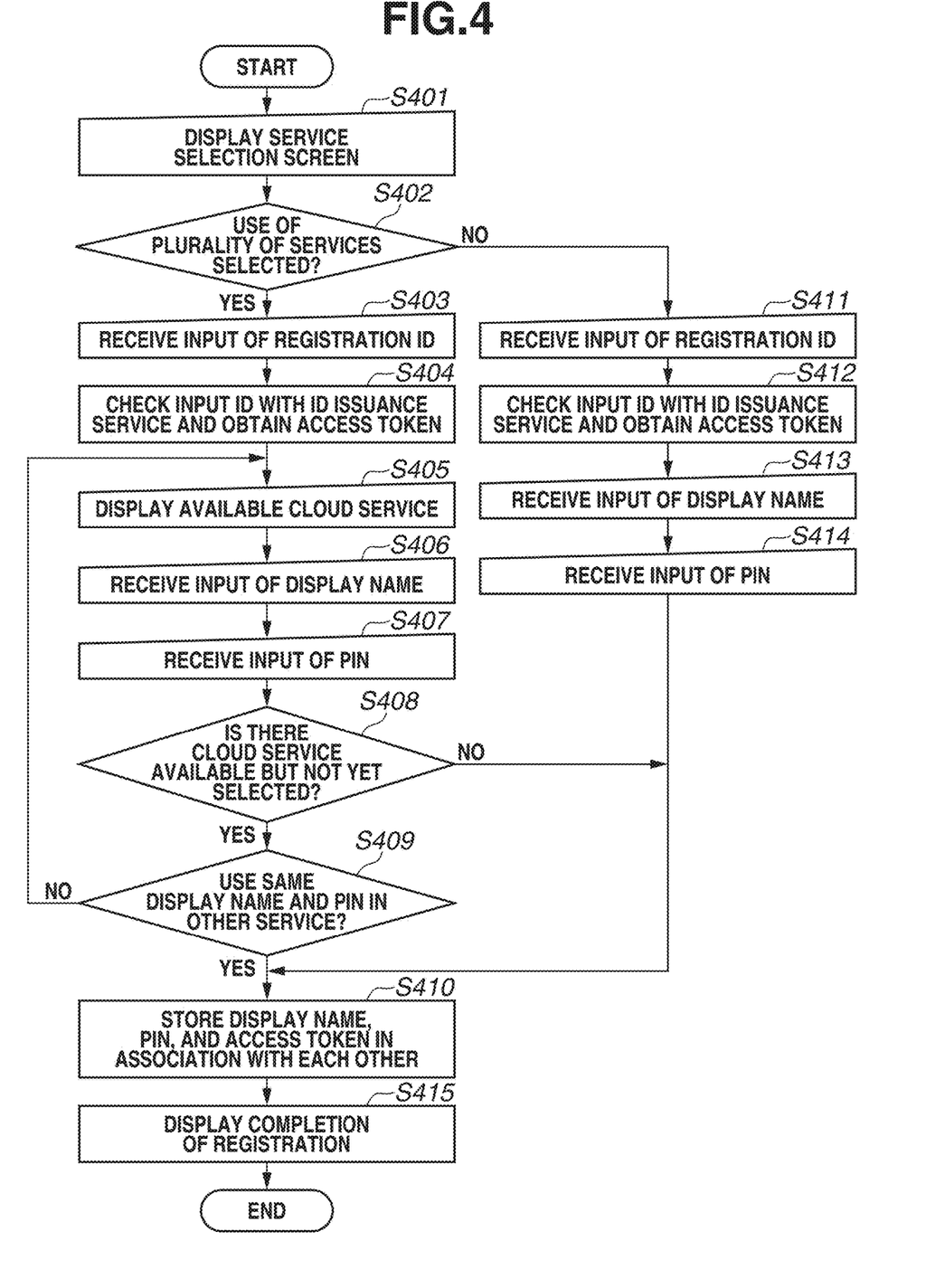
FIG. 4 is a flowchart illustrating registration processing for use of the cloud service in a multifunction peripheral.

FIG. 4 is a flowchart illustrating processing for use registration of the cloud service in the multifunction peripheral 101. The present processing is realized by the CPU 103 of the multifunction peripheral 101 executing a program using the RAM 105.

Figure 9:
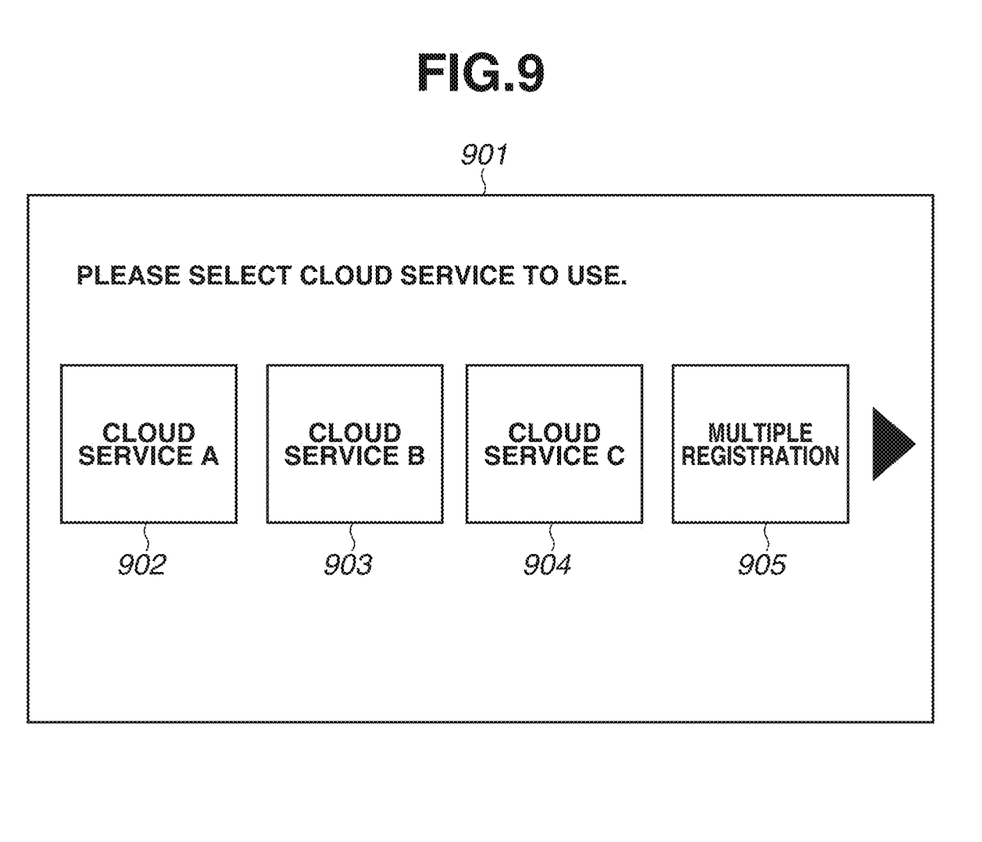
FIG. 9 illustrates an example of a screen indicating a list of cloud services to be used in the multifunction peripheral.

In step S401, the multifunction peripheral 101 displays a screen 901 including a list of cloud services that can be used in the multifunction peripheral 101 as illustrated in FIG. 9 by the display control unit 108 and receives a selection of a cloud service from a user. The screen 901 includes selection items for each of cloud services 902, 903, and 904 and also includes a multiple registration button 905 as an option for using a multiple service registration ID for collectively registering a plurality of services.

In step S402, the multifunction peripheral 101 determines whether the multiple registration button 905 is selected. In a case where the multiple registration button 905 is selected (YES in step S402), the processing proceeds to step S403. In a case where a button corresponding to one cloud service is selected (NO in step S402), the processing proceeds to step S411.

Figure 10:
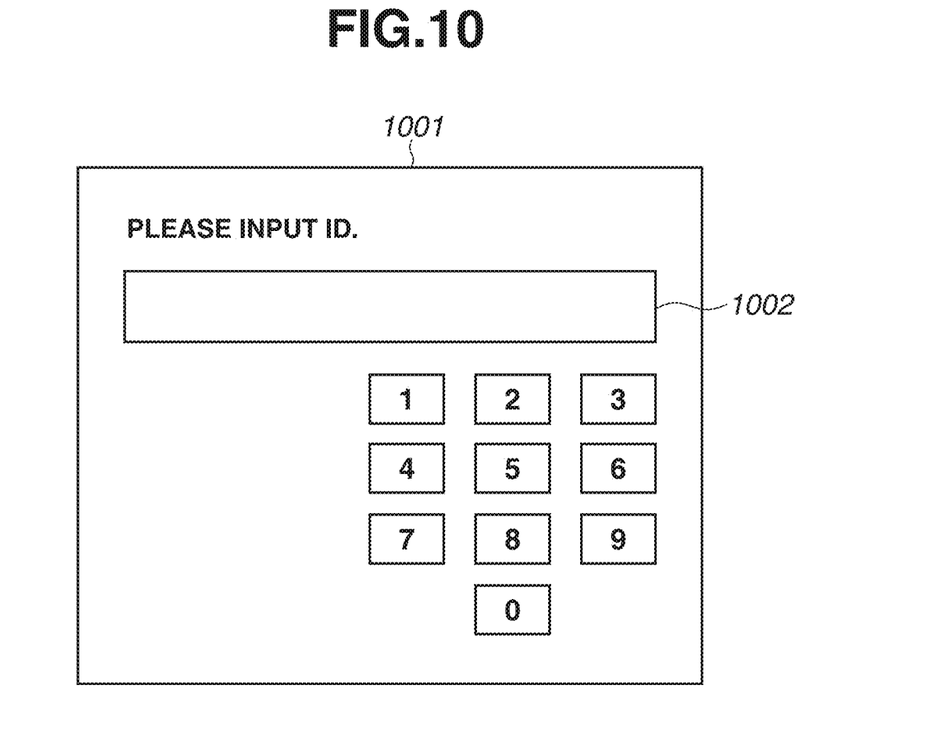
FIG. 10 illustrates an example of a screen for receiving the registration ID in the multifunction peripheral.

In step S411, the multifunction peripheral 101 displays a registration ID receiving screen 1001 illustrated in FIG. 10 by the display control unit 108 and receives an input of the registration ID from the user. The user inputs the registration ID presented in step S207 into an entry field 1002. In step S412, the multifunction peripheral 101 transmits the input registration ID to the web server 115 via the network controller 106. The web server 115 checks the input registration ID with the ID issuance service, and as a result, the multifunction peripheral 101 obtains the access token stored in association with the registration ID from the web server 115.

Figure 12:
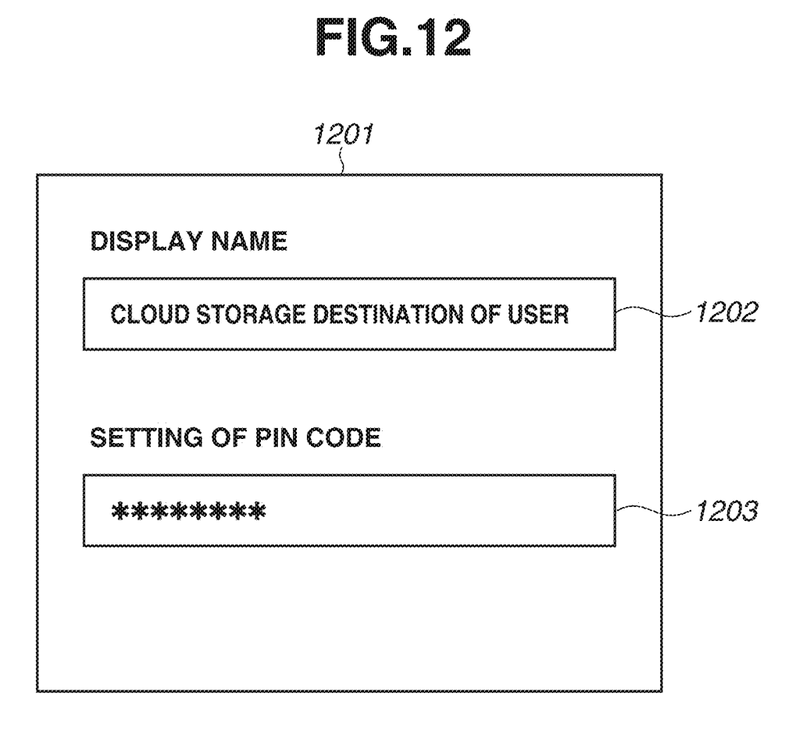
FIG. 12 illustrates an example of a screen for receiving an input of a display name and a personal identification number (PIN) in the multifunction peripheral.

Then, the multifunction peripheral 101 displays a screen 1201 illustrated in FIG. 12 by the display control unit 108. In step S413, the multifunction peripheral 101 receives an input of the display name in the multifunction peripheral from the user via an entry field 1202. The display name is used for selecting a storage destination (an account) for the cloud service in the multifunction peripheral 101 at the time when the user uses the cloud service in the future. The "display name" is information to be used by the user who uses the multifunction peripheral 101 to grasp a data storage destination for the cloud service and is not necessary to be matched with an account name used in the cloud service. In step S414, the multifunction peripheral 101 receives, from the user via an entry field 1203, an input of an identification code to be used by the user to use the cloud service in the future. An example of the identification code used in this processing is a personal identification number (PIN) code.

The input of the PIN may be optional. In a case where the PIN is not input, the cloud service is used from the multifunction peripheral 101 using the access token in the subsequent processing without an input of a PIN.

In step S403, the multifunction peripheral 101 displays the registration ID receiving screen 1001 by the display control unit 108 and receives an input of a registration ID from the user. The user inputs "the multiple service registration ID" presented in step S207 into the entry field 1002.

In step S404, the multifunction peripheral 101 transmits the multiple service registration ID input in step S403 to the web server 115 via the network controller 106. The web server 115 checks the multiple service registration ID with the ID issuance service, and as a result, the multifunction peripheral 101 obtains a plurality of the access tokens stored in association with the multiple service registration ID from the web server 115.

Figure 11:
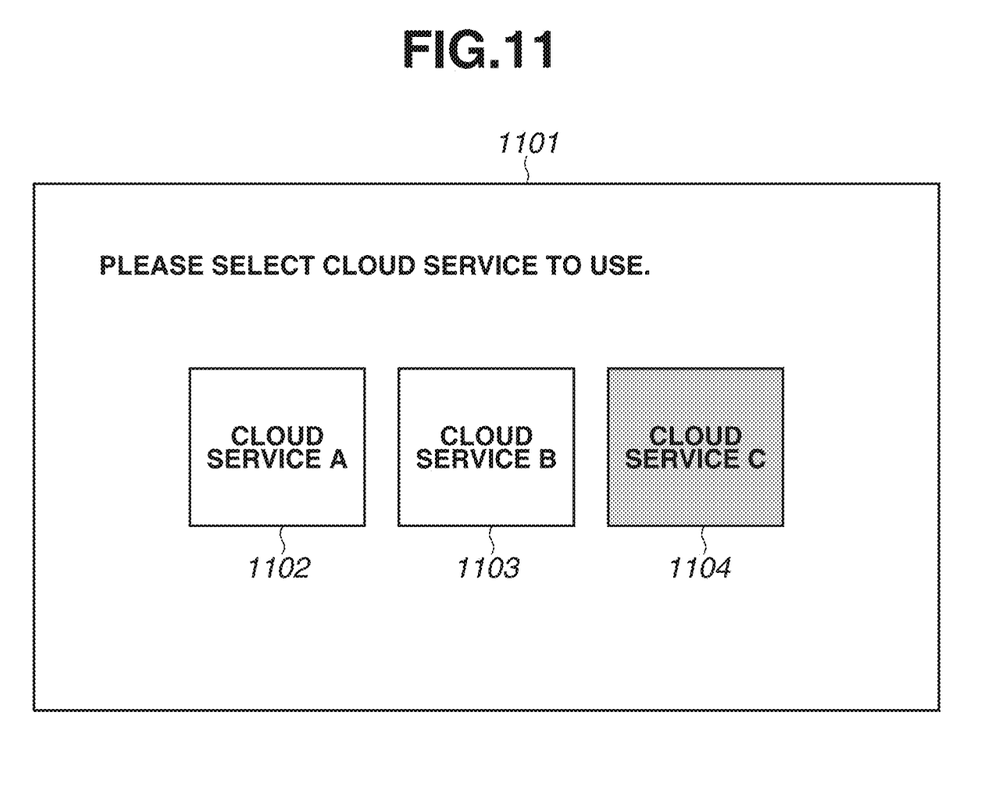
FIG. 11 illustrates an example of a screen for selecting a cloud service to be used in the multifunction peripheral.

Next, in step S405, the multifunction peripheral 101 displays a screen 1101 illustrated in FIG. 11 by the display control unit 108. The screen 1101 includes a list of a plurality of cloud services corresponding to the multiple service registration ID input in step S403. On the screen 1101, cloud services 1102 and 1103 corresponding to the multiple service registration ID can be selected by the user, and a cloud service 1104 which does not correspond to the multiple service registration ID cannot be selected. The cloud service that does not correspond to the multiple service registration ID may be hidden.

After the selection of a cloud service on the screen 1101, the multifunction peripheral 101 displays the screen 1201 illustrated in FIG. 12 by the display control unit 108. In step S406, the multifunction peripheral 101 receives an input of the display name of the cloud service selected on the screen 1101 via the entry field 1202. Further, in step S407, the multifunction peripheral 101 receives an input of the PIN of the cloud service selected on the screen 1101 via the entry field 1203. The input of the PIN may be optional. The processing of receiving the inputs of the display name and the PIN in steps S406 and S407 is similar to the processing in steps S413 and S414.

In step S408, the multifunction peripheral 101 determines whether there is any cloud service that is not yet selected on the screen 1101 in the plurality of cloud services corresponding to the multiple service registration ID. In a case where there is a cloud service not yet selected (YES in step S408), the processing proceeds to step S409. In a case where all of the cloud services are selected (NO in step S408), the processing proceeds to step S410.

Figure 13:
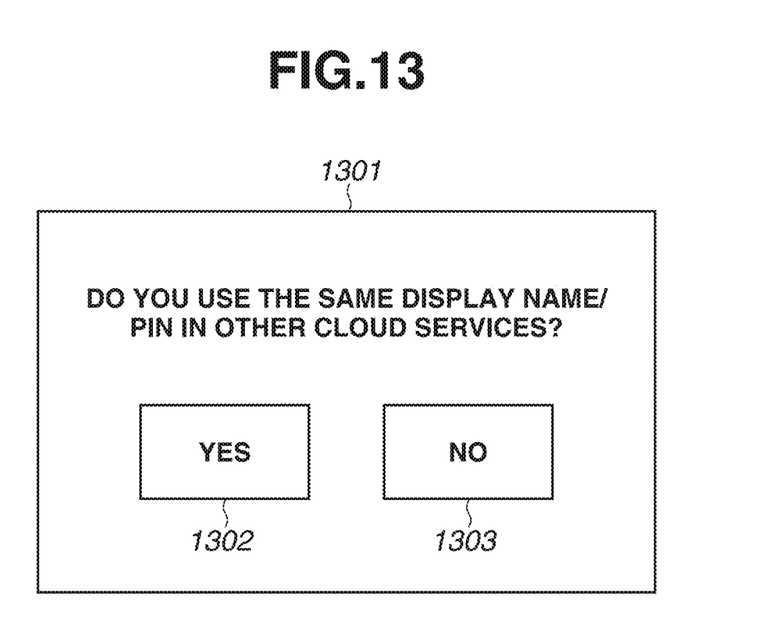
FIG. 13 illustrates an example of a screen for inquiring whether to use the same display name and PIN in a plurality of cloud services in the multifunction peripheral.

In step S409, the multifunction peripheral 101 inquires of the user about whether to use the display name and the PIN received in steps S406 and S407 in the other cloud service corresponding to the multiple service registration ID by displaying a screen 1301 illustrated in FIG. 13 by the display control unit 108. The screen 1301 includes a button 1302 to select to use the same information in the other cloud service and a button 1303 to select not to use the same information. In a case where the button 1302 is selected (YES in step S409), the processing proceeds to step S410. In a case where the button 1303 is selected (NO in step S409), the processing returns to step S405. In a case where a user uses a plurality of cloud services, the user can access any of the cloud services from the multifunction peripheral 101 using the access token obtained in advance by inputting the same display name and PIN. In other words, the exemplary embodiment can improve security to prevent an account of a user from being used by other users and can also improves the convenience for users since it is not necessary for users to remember a plurality of combinations of display names and PINs for each cloud service to access the cloud service from the multifunction peripheral 101.

Figure 14:
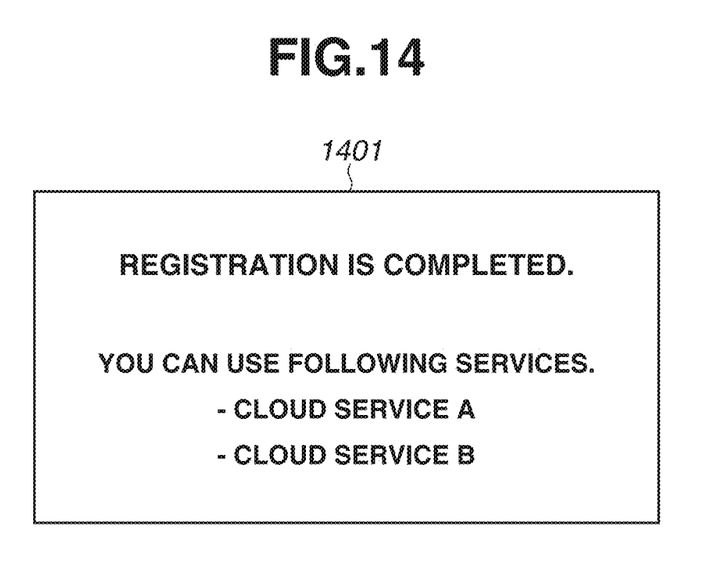
FIG. 14 illustrates an example of a screen for notifying a user of completion of registration of the cloud service in the multifunction peripheral.

In step S410, the multifunction peripheral 101 stores the display name, the PIN, and the access token in association with each other in the storage device 110. In step S415, the multifunction peripheral 101 displays a screen 1401 indicating completion of registration illustrated in FIG. 14 by the display control unit 108, and the present processing is then terminated. The screen 1401 indicates that two cloud services are available.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-114217, filed Jul. 1, 2020, which is hereby incorporated by reference herein in its entirety.

What is claimed is:

1. An image processing apparatus comprising:
a scanner;
at least one memory storing instructions; and
at least one processor executing the instructions causing the image processing apparatus to:
receive an input of a confirmation code that is issued upon selecting a cloud service via a website provided for the image processing apparatus in order to use the cloud service from the image processing apparatus;
transmit the confirmation code to a server that provides the website;
receive, in a case where a plurality of cloud services is managed in association with the confirmation code in the server, an input of a display name to be displayed in the image processing apparatus for each cloud service at a time when the cloud service is selected to be used in the image processing apparatus; and
store a display name received for each of the plurality of cloud services managed in association with the confirmation code,
wherein, in a case where an input of an identification code is further received in addition to the input of the display name with respect to any one of the plurality of cloud services managed in association with the confirmation code, both of the display name and the identification code are stored with respect to the cloud service.

2. The image processing apparatus according to claim 1, wherein the instructions further cause the image processing apparatus to obtain an access token required to use each of the plurality of cloud services managed in association with the confirmation code from the server, and
wherein the obtained access token is stored in association with at least the received display name with respect to the corresponding cloud service.

3. The image processing apparatus according to claim 1, wherein the instructions further cause the image processing apparatus to receive a setting for using the same display name with respect to the plurality of cloud services.

4. The image processing apparatus according to claim 1, wherein the instructions further cause the image processing apparatus to provide a display for selecting a button to perform processing to use one cloud service or a button to collectively perform processing to use a plurality of cloud services before an input of the confirmation code.

5. The image processing apparatus according to claim 1, wherein the plurality of cloud services includes a storage service for storing data obtained by a scanning function.

6. The image processing apparatus according to claim 1, wherein the plurality of cloud services includes a facsimile service for transmitting data obtained by a scanning function via a facsimile.

7. A method executed by an image processing apparatus including a scanner, the method comprising:
receiving an input of a confirmation code that is issued upon selecting a cloud service via a website provided for the image processing apparatus in order to use the cloud service from the image processing apparatus;
transmitting the confirmation code to a server that provides the website;
receiving, in a case where a plurality of cloud services is managed in association with the confirmation code in the server, an input of a display name to be displayed in the image processing apparatus for each cloud service at a time when the cloud service is selected to be used in the image processing apparatus; and
storing a display name received for each of the plurality of cloud services managed in association with the confirmation code,
wherein, in a case where an input of an identification code is further received in addition to the input of the display name with respect to any one of the plurality of cloud services managed in association with the confirmation code, both of the display name and the identification code are stored with respect to the cloud service.

* * * * *